May 20, 1958     W. C. KLANK, JR     2,835,263
LIQUID STORAGE TANK FOR VEHICLES
Filed Sept. 27, 1955
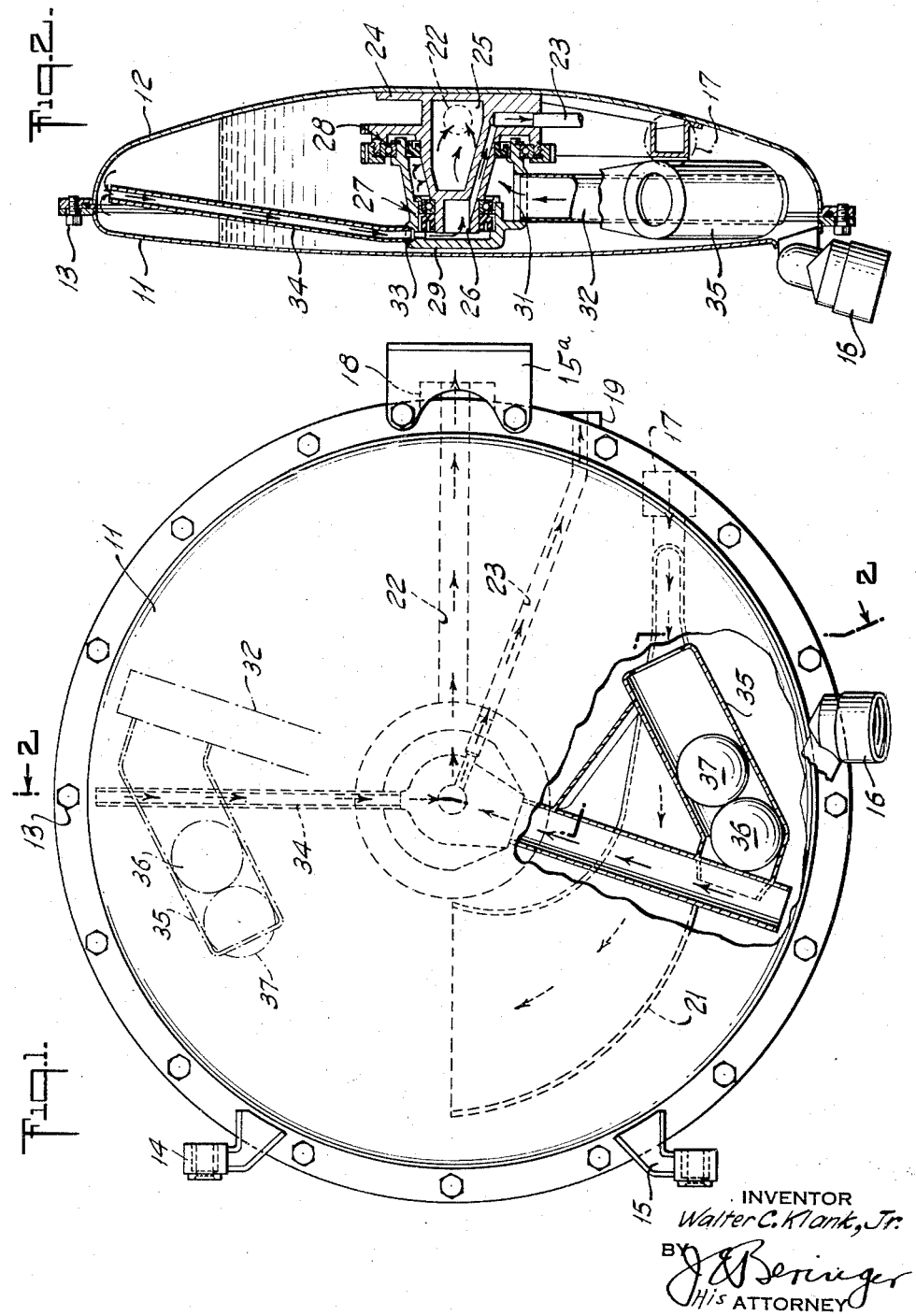
INVENTOR
Walter C. Klank, Jr.
BY
His ATTORNEY

United States Patent Office 2,835,263
Patented May 20, 1958

2,835,263

LIQUID STORAGE TANK FOR VEHICLES

Walter C. Klank, Jr., Dayton, Ohio, assignor to United Aircraft Products, Inc., Dayton, Ohio, a corporation of Ohio Application September 27, 1955, Serial No. 536,834

5 Claims. (Cl. 137—45)

This invention relates to liquid storage tanks, particularly oil tanks installed in aircraft and subject to the changing attitude of such a vehicle relatively to the earth's surface.

In such tanks, some of which store lubricating oil for the engine and others of which store hydraulic oil for hydraulic actuating systems, the oil is circulated from the tank to a place of use and back to the tank. It is desirable that the tank comprise a pick-up connection which is completely submerged in the body of oil in the tank at all times and further comprise a vent for carrying off released air and for avoiding entrapment of air in the tank. It has accordingly been heretofore known to utilize a pendulum mechanism disposed within the tank for relative rotary motion in such wise as to be self-adjusting in response to changing flight attitudes.

It is an object of the invention to present a generally new oil tank structure of the kind described, having special regard to a pendulum mechanism of simple and reliable construction.

Another object of the invention is to provide for a changing center of gravity in the pendulum mechanism whereby better to assure self-adjustment of the pendulum mechanism in response to changing positions of the tank.

A further object of the invention is to obviate a "hanging-up" of the pendulum mechanism in an inverted position of the oil tank.

Other objects and structural details of the invention will more clearly appear from the following description when read in connection with the accompanying drawings, wherein:

Fig. 1 is a view in front elevation, partly broken away, of an oil tank in accordance with the illustrated embodiment of the invention; and Fig. 2 is a view in cross section, taken substantially along the line 2—2 of Fig. 1.

Referring to the drawings, the tank of the illustrated embodiment of the invention comprises generally concave shell elements 11 and 12 in opposing relation and having flanges at their peripheries bolted together by screw studs 13. Brackets 14, 15 and 15a provide for stationary mounting of the tank in the aircraft. A normally closed fitting 16 is provided for filling of the tank. A fitting 17 is provided for oil return flow. A fitting 18 is provided for oil outlet flow, and a fitting 19 is provided for vent purposes. The oil return fitting 17 communicates with the small end of a funnel-like baffle 21 supported within the tank between the shell elements 11 and 12 and serving to minimize surging, foaming or vortexing of the oil as it enters the reservoir from the return line. In addition, the baffle prevents a high velocity direct internal flow through the tank from the return fitting to the outlet fitting. The fittings 18 and 19 are respectively connected by tubes 22 and 23 with a fixed hub 24 secured to the shell element 12 in an intermediate transverse plane approximately coinciding with the longitudinal axis of the tank.

The hub 24 is internally partitioned to define a chamber 25 communicating with the tube 22 and a chamber 26 communicating with the tube 23. On the exterior of the hub are longitudinally spaced apart bearings 27 and 28 providing a rotary mounting for a pendulum hub member 29. The pendulum hub 29 is in substantially telescoping relation to the fixed hub 24 and has a radial opening 31 receiving one end of an oil pick-up tube 32. Also in the pendulum hub 29 is a substantially radial opening 33 receiving one end of a vent tube 34. Through the opening 31, the oil pick-up tube 32 communicates with the chamber 25 in the hub 24. Similarly, the vent tube 34 communicates through opening 33 with the chamber 26 in the hub 24. At their outer ends, the tubes 32 and 34 extend to points just short of contact with the inner peripheral wall of the tank.

There is secured to the tube 32, near its outer end, a cage 35 receiving a pair of rolling balls 36 and 37 and of a length to permit rolling movement of the balls longitudinally of the cage. The cage 35 is inclined relatively to the tube 32, in a lateral or circumferential direction in relation to the configuration of the tank.

With the parts positioned as shown in Fig. 1, the balls 36 and 37 occupy a lowermost position in the cage 35, limiting against the bottom of the cage, as defined by the tube 32. So positioned, a center of gravity for the pendulum assembly comprising the hub 29 and tubes 32 and 34 which is offset relatively to the axis of the oil pick-up tube 32 and which is approximately 180° distant from the vent tube 34. It will be understood that in the event of a changing rotary position of the oil tank about its longitudinal axis, the pendulum assembly described will make a compensating adjustment to maintain itself in the relative position shown in Fig. 1 wherein the outer end of the tube 32 is completely submerged in oil and wherein the outer end of the tube 34 extends well above the normal oil level in the tank. As a result, in any such position of the tank, oil may be continuously supplied to the system by the tube 32 leading to the chamber 25 in the hub 24 and thence to tube 22 and outlet fitting 18. Similarly, the space above the oil level, within the tank, continuously is vented by the tube 34 leading to chamber 26 in the hub 24 and thence by way of tube 23 to vent fitting 19.

The above mentioned cage and ball construction provides for a shift in the center of gravity of the pendulum assembly in a manner to increase the leverage of the moment arm tending to hold the pendulum assembly from a following motion in relation to the tank. Thus, should the oil tank be inverted from the position shown in Fig. 1, there may be a tendency for the pendulum assembly to "hank-up" or to become balanced in an inverted position. In the present instance, however, should the pendulum assembly become so balanced, the balls 36 and 37 roll down the raceway provided in the cage 35 to the upper or outer end thereof, in the manner indicated in dotted lines in Fig. 1, with the result that the condition of balance promptly is destroyed and the pendulum assembly swings about the hub 24 to its normal operating position. The construction and arrangement of parts is predetermined to provide a lever arm of sufficient length to provide a moment in excess of the torque required for rotation. The parts have in the present instance been disclosed in connection with the tank, for holding hydraulic oil, of relatively small size and capacity.

What is claimed is:

1. An oil tank, comprising a shell enclosure holding a body of oil, a stationary hub mounted on said shell in an intermediate transverse plane, said stationary hub being formed with separated chambers, means for separately communicating said chambers to the exterior of said tank shell, pendulum hub means rotatable on said stationary hub, oil pick-up means including an oil pick-up tube extending outward in the tank from said pendulum hub means, a venting tube extending outward in the tank from said pendulum hub means, said tubes separately communicating with respective chambers in said stationary hub and said venting tube being circumferentially spaced from the center of gravity of said oil pick-up means a distance of approximately 180°, and means locating the center of gravity of said oil pick-up means in circumferential offset relation to said oil pick-up tube.

2. An oil tank according to claim 1, characterized in that said oil pick-up means further includes movable means for shifting the center of gravity of said pick-up means.

3. An oil tank, comprising a shell enclosure, a hub assembly in an intermediate transverse plane in said enclosure, including a fixed hub on said shell and a pendulum hub rotatable on said fixed hub, said hubs having intercommunicating passages for conducting oil from the tank and for venting air therefrom, separate pick-up tubes extending outward from said pendulum hub into the tank, a cage attached to one of said tubes, and weight means in said cage defining a center of gravity for the assembly comprising said pendulum hub and said tubes and said cage laterally offset from the tube on which said cage is mounted, the other one of said tubes being located in a circumferential sense approximately 180° from said center of gravity.

4. An oil tank according to claim 3, characterized in that said weight means includes a rolling ball movable in the event of sticking of said assembly relatively to said fixed hub momentarily to shift the center of gravity thereof.

5. An oil tank, comprising a tank shell, a fixed hub on said shell in an intermediate transverse plane, a rotary hub on said fixed hub within said shell, an oil pick-up tube extending outward in the tank from said rotary hub and communicating through said hubs with the exterior of the tank, a cage attached to said tube in laterally extending relation thereto, and rolling ball means in said cage providing a moment arm for swinging motion of the assembly comprising said rotary hub and said tube relatively to said fixed hub, said rolling ball means being movable relatively to said assembly to increase the length of said moment arm.

References Cited in the file of this patent
UNITED STATES PATENTS

| | | |
|---|---|---|
| 2,662,538 | Cervino et al. | Dec. 15, 1953 |
| 2,740,563 | Jackson | Apr. 3, 1956 |